United States Patent [19]

McBrien

[11] Patent Number: 4,987,779

[45] Date of Patent: Jan. 29, 1991

[54] PULSE-DRIVEN ACCELEROMETER ARRANGEMENT

[75] Inventor: Gregory J. McBrien, Cromwell, Conn.

[73] Assignee: United Technologies Corporation, Hartford, Conn.

[21] Appl. No.: 317,217

[22] Filed: Feb. 28, 1989

[51] Int. Cl.$^5$ .............................................. G01P 15/13
[52] U.S. Cl. .................................................. 73/517 B
[58] Field of Search ....................................... 73/517 B

[56] References Cited

U.S. PATENT DOCUMENTS

| | | | |
|---|---|---|---|
| 3,911,738 | 10/1975 | Fischer | 73/517 B |
| 4,345,474 | 8/1982 | Deval | 73/517 B |
| 4,353,254 | 10/1982 | Schroeder et al. | 73/517 B |
| 4,679,434 | 7/1987 | Stewart | 73/517 B |

Primary Examiner—John Chapman
Attorney, Agent, or Firm—Peter R. Ruzek

[57] ABSTRACT

An accelerometer arrangement includes an acceleration sensor that includes two capacitor plates having respective parallel mutually facing major surfaces which bound a sensing gap therebetween. A plate-shaped electrically chargeable proof mass is resiliently mounted in the gap in parallelism with the major surfaces for displacement in response to the action of acceleration forces thereon out of a substantially central rest position toward one or the other of the major surfaces depending on the direction of the acceleration forces. An electrical potential difference is established between the capacitor plates to generate respective electrostatic fields between the capacitor plates and the proof mass which cause a proof mass electrical potential variation having a magnitude and sense depending on the extent and direction of the displacement of the proof mass out of its rest position. The variation is evaluated and an a pulse train that is proportionate to the variation is generated and supplied to the proof mass to esatablish thereat a voltage sufficient for electrostatic forces caused thereby between the proof mass and the capacitor plates to return the proof mass to the rest position thereof against the action of the acceleration forces on the proof mass.

2 Claims, 3 Drawing Sheets

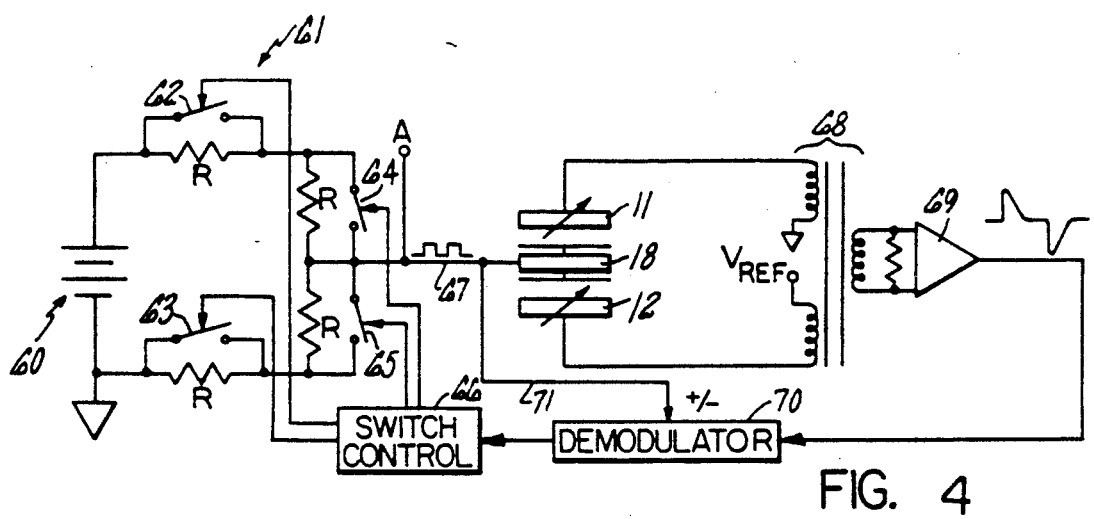
FIG. 4
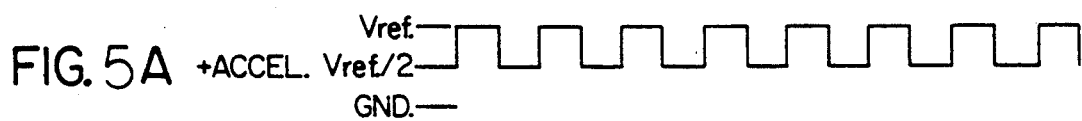
FIG. 5A +ACCEL.
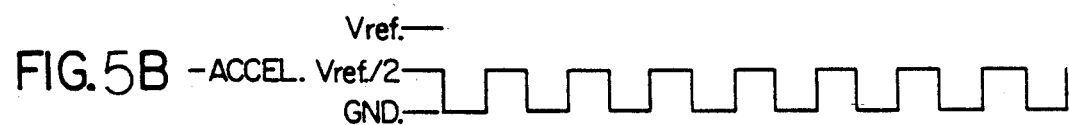
FIG. 5B −ACCEL.
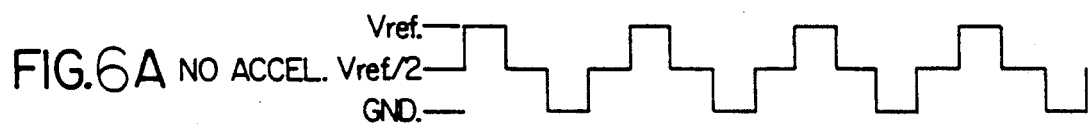
FIG. 6A NO ACCEL.
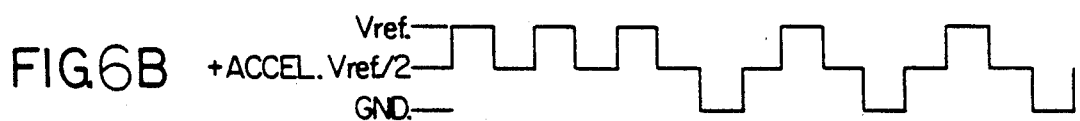
FIG. 6B +ACCEL.
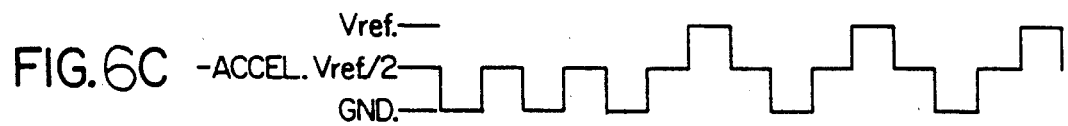
FIG. 6C −ACCEL.

PULSE-DRIVEN ACCELEROMETER ARRANGEMENT

TECHNICAL FIELD

The present invention relates to accelerometers in general, and more particularly to capacitative accelerometers.

BACKGROUND ART

There are already known various constructions of accelerometers, among them such utilizing a very thin doped silica plate resiliently suspended between two capacitor plates as a proof mass that is displaced by acceleration forces out of its rest or null position, with attendant changes in the capacitances and electrostatic fields existing between the proof mass and the capacitor plates that are charged to different electrical potentials. It is also already known to determine the extent and direction of the displacement of the proof mass out of its rest position from the electric current which flows into or out of the proof mass as a result of electric potential variations occurring in the proof mass when it is displaced out of its rest position due to the aforementioned changes. However, experience with accelerometers of this type has shown that they provide very unreliable measurement results, particularly since the value of the aforementioned electric current is a complex, and by and large unpredictable function not only because the potential change in the proof mass in a non-linear function of the displacement and is also dependent on the potential difference between the capacitor plates which it may be very difficult or impossible to maintain constant at all times or over an extended period of time, but also because the displacement itself is a non-linear function of the acceleration forces acting on the proof mass owing to, among others, non-linear response of the resilient means, such as flexible hinges, which mount the proof mass in its position between the capacitor plates, the effects of aging on the mechanical properties of the hinges, temperature related changes in mechanical properties and dimensions, and the like.

Accordingly, it is a general object of the present invention to avoid the disadvantages of the prior art.

More particularly, it is an object of the present invention to provide an accelerometer arrangement which does not possess the disadvantages of the known arrangements of this kind.

Still another object of the present invention is so to develop the accelerometer arrangement of the type here under consideration as to provide reliable measurement results with a very high degree of precision.

It is yet another object of the present invention to devise an electrical driving circuit for use in an accelerometer arrangement of the above type, which circuit renders it possible to obtain a highly reliable and precise indication of the acceleration forces acting on the proof mass.

A concomitant object of the present invention is to design the driving circuit and accelerometer arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an accelerometer arrangement which comprises as one of its components at least one acceleration sensor. This sensor includes two capacitor plates having respective parallel mutually facing major surfaces which bound a sensing gap therebetween, a plate-shaped electrically chargeable proof mass, and means for resiliently mounting the proof mass in the gap in parallelism with the major surfaces for displacement in response to the action of acceleration forces thereon out of a substantially central rest position toward one or the other of the major surfaces depending on the direction of the acceleration forces. There is further provided means for establishing an electrical potential difference between the capacitor plates to generate respective electrostatic fields between the capacitor plates and the proof mass which cause a proof mass electrical potential variation having a magnitude and sense depending on the extent and direction of the displacement of the proof mass out of the rest position thereof. The arrangement of the present invention further includes means for evaluating the variation and for supplying to the proof mass an electrical control signal sufficient to establish on the proof mass a voltage that is proportionate to the variation and at which electrostatic forces caused thereby between the proof mass and the capacitor plates return the proof mass to the rest position thereof against the action of the acceleration forces thereon, including means for generating a train of pulses which alternate between at least two voltage levels and the succession, duration and sense of which are such that the time average of the pulses substantially establishes the voltage on the proof mass.

BRIEF DESCRIPTION OF THE DRAWING

The present invention will be described in more detail below with reference to the accompanying drawing in which:

FIG. 4 is a diagrammatic view akin to that of FIG. 2 but showing a different construction of the driving circuit; and FIGS. 5A and 5B and 6A to 6C are graphic representations of various elemental waveforms utilized in the driving circuit of FIG. 4.

BEST MODE FOR CARRYING OUT THE INVENTION

Figure 1:
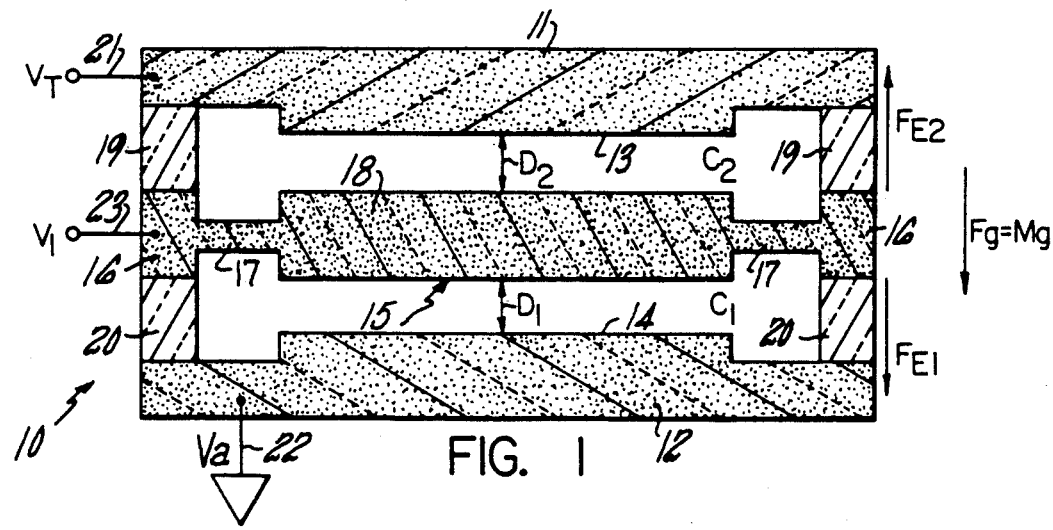
FIG. 1 is a simplified cross-sectional view of an example of an acceleration sensor that can be used in an accelerometer arrangement of the present invention.

Referring now to the drawing in detail, and first to FIG. 1 thereof, it may be seen that the reference numeral 10 has been used therein to identify an acceleration sensor in its entirety. The acceleration sensor 10 includes two capacitor components 11 and 12 having respective major surfaces 13 and 14 which are parallel to one another, face each other and are spaced from one another by a predetermined distance to define a capacitor gap therebetween. While the capacitor components 11 and 12 are shown to have substantially plate-shaped configurations and hence are being referred to herein as capacitor plates, it is to be understood that they could have any other configurations so long as they are provided with the parallel and spaced major surfaces 13 and 14 that bound the capacitor gap. The major surfaces 13 and 14 are advantageously coextensive with one another.

A proof component generally identified by the reference numeral 15 is arranged between the capacitor plates 11 and 12 and includes a circumferentially complete connecting portion or separate connecting portions 16, usually but not necessarily separate flexible hinge portions 17, and a central proof mass 18 which is resiliently connected to the connecting portion or portions 16 by the hinge portions 17. The capacitor plates 11 and 12 and the proof component 15 are advantageously made of silica which is at least partially doped to impart electrically conductive properties to such doped portions. The proof component 15 is connected to and preferably electrically insulated from the two capacitor plates 11 and 12 by respective connecting and spacing bodies 19 and 20 which are interposed between the connecting portion or portions 16 of the proof component 15 and the corresponding regions of the capacitor plates 11 and 12.

The proof mass 18 is held by the hinge portions 17 in the illustrated rest position in which it is parallel to and substantially equidistantly spaced from the major surfaces 13 and 14 of the capacitor plates 11 and 12 so long as no external acceleration forces act on the acceleration sensor 10. However, if the acceleration sensor 10 is subjected to acceleration having at least a component directed normal to the major surfaces 13 and 14 of the capacitor plates 11 and 12, the flexible mounting provided by the hinge portions 17 will permit the proof mass 18 to become displaced by the acceleration or inertial forces acting thereon out of its rest position toward one or the other of the major surfaces 13 and 14, depending on the direction of the applied acceleration. The flexible portions 17 are preferably constructed and distributed about the periphery of the proof mass 18 in such a manner that the proof mass 18 remains in substantial parallelism with the major surfaces 13 and 14 of the capacitor plates 11 and 12 during this displacement.

The capacitor plates 11 and 12 and the proof component 15 are shown to be provided with respective terminals 21, 22 and 23. When, as shown, the terminal 22 is grounded and a voltage $V^T$ is applied to the terminal 21, resulting in the formation of an electric field between the major surfaces 13 and 14, the proof mass 18 will tend to be at a voltage $V_P$ which is dependent on the distances $D_1$ and $D_2$ from the major surfaces 13 and 14, respectively and which will also appear in a steady state condition at the terminal 23, where it could be read to determine the position of the proof mass 18 relative to the capacitor plates 11 and 12. However, as mentioned before, the value of this proof plate voltage $V_p$ is such a complex function of so many variables that the only thing that could be determined with certainty from the value of the voltage $V_p$ after the proof mass 18 has been displaced by acceleration forces out of its rest position would be the existence of the component of such acceleration that acts in the direction of the primary axis extending normal to the surfaces 13 and 14, while any conclusions arrived at from the value of the voltage $V_p$ as to the magnitude of such acceleration component would be approximations at best.

To avoid this uncertainty, it was proposed to force the proof mass voltage $V_p$ to a level at which the electrostatic forces existing between the proof mass 18 and the capacitor plates 11 and 12 return the proof mass 18 against the action of acceleration forces thereon to its rest or null position. This technique is based on the recognition of the fact that the influence of manufacturing tolerances, temperature and/or material aging on the flexibility of the hinge portions 17, which is a very relevant factor in the determination of the extent of displacement of the proof mass 18 by acceleration forces acting thereon out of its rest position, becomes irrelevant when the proof mass 18 is in its rest position, because then the extent of displacement of the proof mass 18 out of its rest position is zero. Consequently, it is merely necessary to give the proof mass voltage $V_p$ such a value that the net electrostatic force acting on the proof mass 18 in the rest position thereof (i.e. the vectorial sum of the electrostatic forces acting between the proof mass 18 and the capacitor plates 11 and 12) is equal and opposite when the proof mass 18 is in its rest position to the sum total of the acceleration forces acting on the proof mass 18 in the direction of the primary axis of the acceleration sensor 10.

To understand this concept underlying the present invention, it is to be realized that the electrostatic force $F_E$ between the proof mass 18 and one of the capacitor plates 11 and 12 is given by:

$$F_E = \frac{\epsilon_o A V^2}{2D^2}$$

wherein
A = effective capacitor plate area,
= dielectric constant,
V = voltage difference between the proof mass and the one capacitor plate, and
D = distance between the proof mass and the one capacitor plate.

When the proof mass 18 is in its rest position, that is, substantially centrally between the major surfaces 13 and 14, the net electrostatic force $F_E$ is equal to the acceleration for $F_g$ (which is equal to the product of mass m and acceleration g), and the net static force $F_E$ is equal to the vectorial sum of, that is, the difference between, the partial 15 electrostatic forces $F_{EI}$ and $F_{E2}$ which exist between the proof mass 18 and the capacitor plates 11 and 12, respectively, and which are proportionate in accordance with the above equation to voltage differences $V_1$ and $V_2$ which are encountered between the proof mass 18 and the major surfaces 13 and 14. Moreover, $V_2 = V^T - V_1$. If $A_1 = A_2$ (as it is in the illustrated construction of the acceleration sensor 10) and $D_1 = D_2$ (as it is in the rest position of the proof mass 18), then $$mg = \frac{\epsilon_o A V_1^2}{2D^2} - \frac{\epsilon_o A (V^T - V_1)^2}{2D^2}$$

$$= \frac{\epsilon_o A}{2D^2}(V_1^2 - (V^T - V_1)^2)$$

$$= \frac{\epsilon_o A}{2D^2}(V_1^2 - (V^T)^2 + 2V^T V_1^2)$$

$$g = \frac{\epsilon_o A}{2mD^2}(2V^T V_1 - (V^T)^2)$$

It may be seen from the above equation that the acceleration g is linearly related to the forcing voltage $V_p$ applied to the proof mass 18 so that the value of g can be easily determined from the value of $V_p$.

Experience with the accelerator arrangement of the last-mentioned type has shown that, inasmuch as this arrangement utilizes direct feeding of the control signal as the requisite control or forcing D.C. voltage to the proof mass 18 and the same control signal is also converted in an output of the arrangement into digital data, with a precision error which may amount to as much as almost the entire least significant data bit, the data obtained from the acceleration arrangement may vary from the actual value by an amount which, given the high sensitivity of the arrangement to outside forces, may be the equivalent of a very significant error in the acceleration force measurement. Moreover, there exist types of accelerometer devices which have two ports that are used to sense the position of the proof mass as it is translated or displaced due to the forces of acceleration, and to force the proof mass back to its original rest or null position. A third port is needed, but not always present, to provide an A.C. excitation to accelerometers that require inductive or capacitive coupling of the nulling signal. Therefore, it is desirable to construct the accelerometer device in such a manner as to be able to combine the excitation and feedback null correction signals into a single port of the device.

Figure 2:
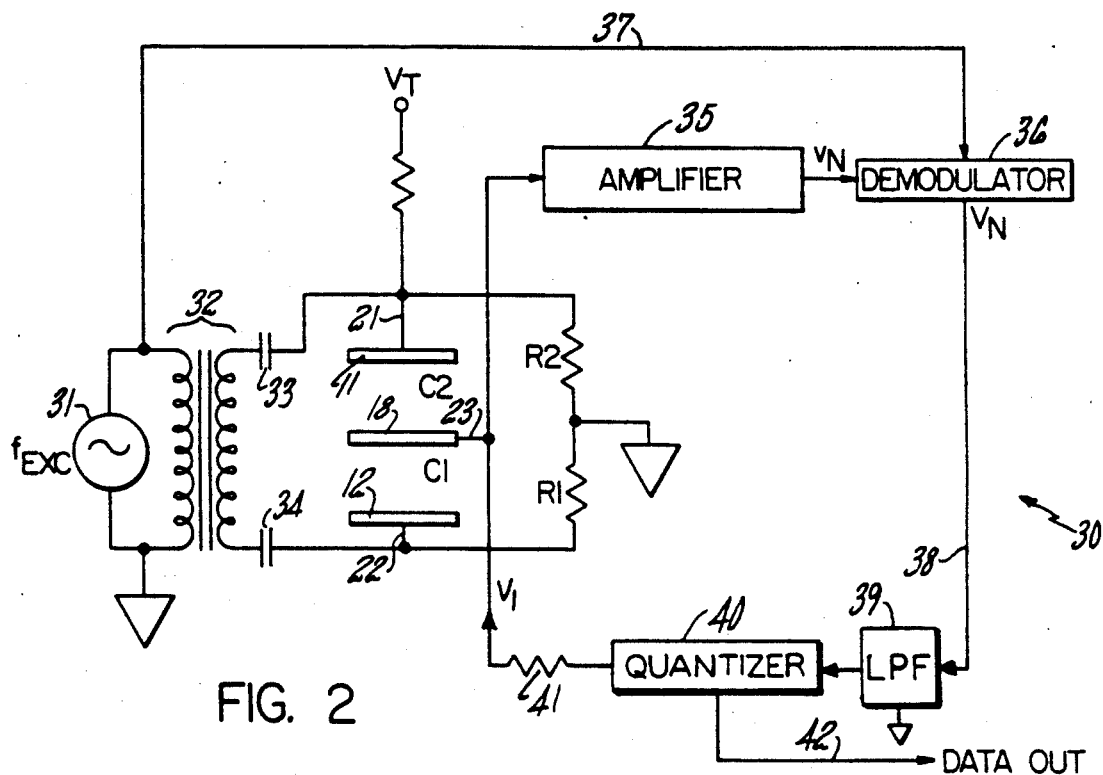
FIG. 2 is a diagrammatic view of the accelerometer arrangement of the present invention showing an electric driving circuit for an only schematically depicted acceleration sensor akin to that of FIG. 1.

FIG. 2 of the drawing, in which the same reference numerals as before have been used to identify corresponding parts, shows one example of the implementation a driving circuit 30 which is constructed to take care of the above-discussed concerns. The circuit 30 includes an oscillator 31 which generates an alternating current at a predetermined frequency. The output of the oscillator 31 is coupled, by means of a transformer 32 and through respective separating capacitors 33 and 34, to the terminals 21 and 22 of the capacitor plates 11 and 12. The terminals 21 and 22 are further connected to the ground through respective resistors $R_1$ and $R_2$, and the voltage $V^T$ is supplied to the terminal 21 and thus to the capacitor plate 11.

The terminal 23 which is electrically connected with the proof mass 18 is connected to an amplifier 35 which may be constructed as a transimpedance amplifier and which converts variations in electric current flowing in and out of the proof mass 18 (predominantly if not exclusively as a result of the action of the alternating currents applied to the capacitor plates 11 and 12 on the proof mass 18) into corresponding variations in an output voltage $V_N$. This output voltage $V_N$ is then supplied to a demodulator 36 where it is demodulated with the alternating current which is issued by the oscillator 31 and which is supplied to the demodulator 36 through an electrical connecting line 37. The amplifier 35 and the demodulator 36 are of conventional constructions and they can be adjusted, in a manner well known to those familiar with this field, in such a manner that the demodulated D.C. voltage $V_N$ of the output signal issued by the demodulator 36 is at the level needed to force the proof mass 18 against the action of the acceleration forces acting thereon into its rest position. This output signal is then applied through a connecting line 38, a low pass filter 39, a quantizing device 40 and a resistor 41 as the requisite control or forcing signal to the terminal 23 of the proof mass 18. Moreover, an output 42 of the quantizing device 40 carries the aforementioned quantized output signal of the quantizing device 40 to a display or other readout device of any known construction which then displays data indicative of the value of the quantized output signal and thus of the value of the acceleration g in any desired form.

Figure 3:
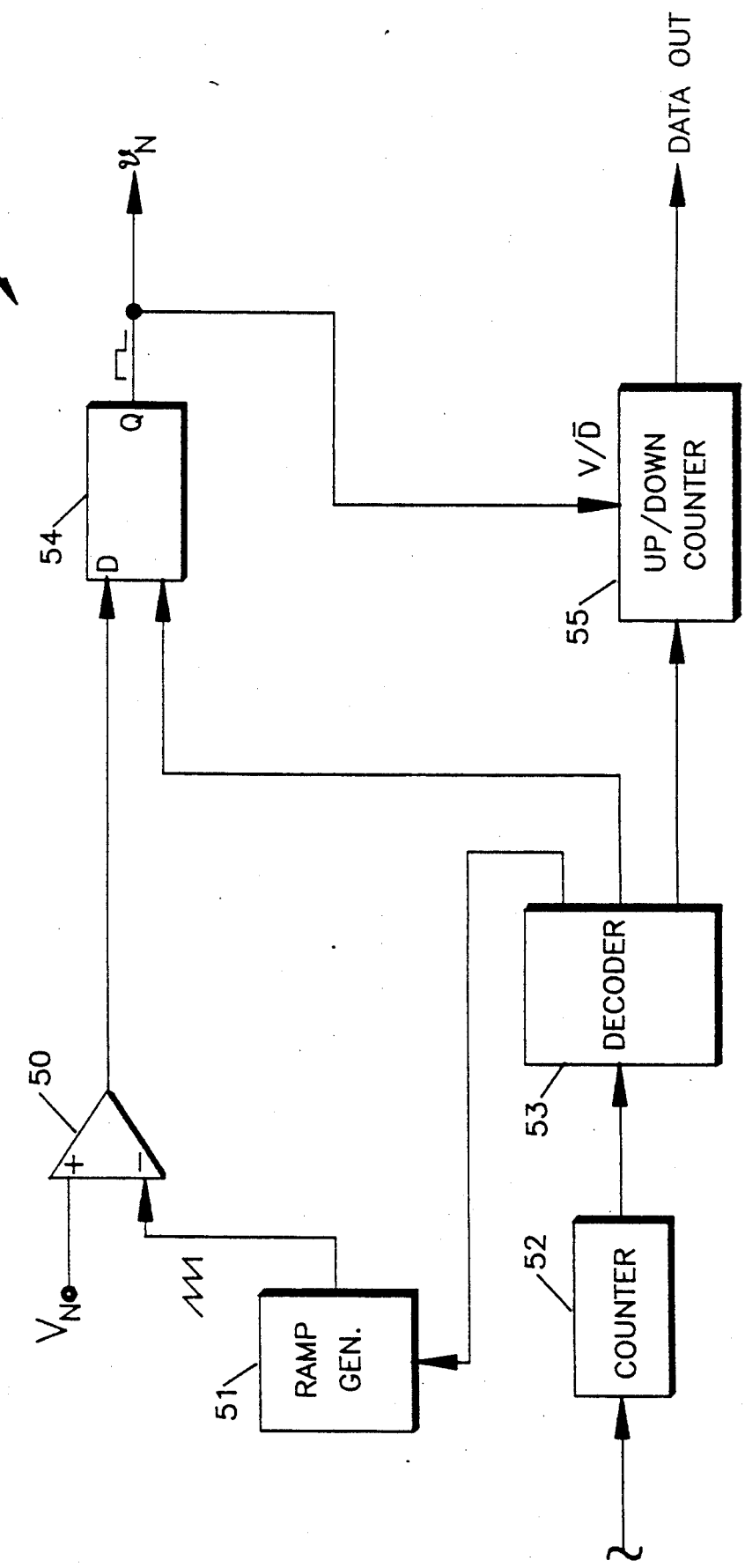
FIG. 3 is a block diagram depicting the construction of a quantizing device which may be used in the driving circuit of FIG. 2.

FIG. 3 of the drawing depicts an example of the construction of the quantizing device 40 that may be used to advantage in the environment of FIG. 2. The output voltage $V_N$ is supplied to one input of a comparator 50, while a ramp voltage issued by a ramp generator that operates under a control of a counter 52 and a decoder 53 is supplied to another input of the comparator 50. In the comparator 50, the output voltage $V_N$ is compared with the ramp waveform which has a precisely controlled period. The resulting output waveform of the comparator 50 is a pulse width modulated (PWM) signal. This output signal is then synchronized to a precision clock that drives the counter 52 and the decoder 53 by a quantizer 54 that is shown to be constituted by a D-flip-flop which is also under the control of the decoder 53. This synchronized signal is then used to provide the nulling voltage to the proof mass 18, as well as providing an input or control signal to an up/down counter 55 which is also controlled by the decoder 53.

In operation, the ramp generator 51 outputs a sawtooth signal with a minimum value corresponding to the minus full scale output of the demodulator 36 and with a maximum value corresponding to the positive full scale output of the demodulator 36. Therefore, the duty cycle of the PWM signal is proportional to the demodulator output signal.

Inasmuch as the synchronized PWM signal is used to control the up/down counter 55, the frequency of the "data out" pulses is proportional to the duty cycle of the nulling voltage. The nulling voltage can then be either passed through a low pass filter and then applied to the proof mass 18, or applied to the proof mass 18 directly, without filtering. In either case, the effective D.C. value of the nulling voltage contains the acceleration information. Since the effective D.C. value of the nulling voltage is also proportional to the duty cycle, the frequency of the "data out" pulses is proportional to the sensed acceleration.

Because this data extraction technique is a part of the accelerometer closed loop system, the actual levels of the ramp generator voltage and of the demodulator output voltage need not be controlled precisely. The system will stabilize at whatever pulse width is required to null the system for a given acceleration input. Also, since any error voltage of the proof mass 18 will result in an output signal at the demodulator output, the system has a built-in memory. This means that, if the system is not nulled exactly, the loop will merely force the quantizer 54 to change its duty cycle. The residue from each conversion (which, as amount above, may amount to as much as almost the entire least significant bit) is stored in the proof mass 18, so that it will influence the position of the proof mass 18 and thus the error signal encountered during the next following conversion cycle. Thus, an improved precision is obtained in the "data out" value over time. In addition, since the output data is a series of pulses, the pulse count is proportional to velocity, resulting in hardware integration of the data.

A fully digital implementation of a circuitry dealing with the above concerns is illustrated in FIG. 4 of the drawing in which once more the same reference numerals as before have been employed to denote corresponding parts. This method has the advantage that the nulling and position sensing voltages are combined into one signal. In this implementation, a D.C. source 60 is used to supply the required power to a switching network 61 which is shown to include four switches 62, 63, 64 and 65 that are bridged by respective resistors R and that are controlled by a switch control 66 in a manner which will become apparent hereafter. For the time being, it is sufficient to mention that an output 67 of the switching network 61 carries a digital waveform that is applied to the proof mass 18. On the other hand, reference voltage $V_{REF}$ and ground voltage are applied to the capacitor plates 12 and 11, respectively, through respective primary windings of a pickup transformer 68 whose secondary winding is connected to an amplifier 69 whose one output is connected to one input of a demodulator 70, while a connecting line 71 supplies the waveform appearing at the output 67 of the switching network 61 to another input of the demodulator 70. The output of the demodulator 70 is then supplied to the switch control 66 which controls the switches 62, 63, 64 and 65 in dependence on the value of the output signal of the demodulator 70, in accordance with a predetermined protocol.

During the operation of the accelerometer arrangement of the above construction, the digital output signal average in the case of no acceleration is the reference voltage divided by two, since the digital waveform has symmetry about the $V_{REF}/2$ point. This results in no net electrostatic force on the proof mass 18. When an acceleration is applied, the demodulation circuitry 70 detects the error from the unbalanced capacitances existing between the proof mass 18 and the one capacitor plate 11, on the one hand, and between the proof mass 18 and the other capacitor plate 12, on the other hand, and causes the switch control to phase switch the digital waveform appearing at the output 67 and supplied to the proof mass 18. This "throws in" at least one additional "up" or "down" pulse relative to the $V_{REF}/2$ level, depending on the direction of the acceleration, into the elemental waveform supplied to the proof mass 18, and this produces a net electrostatic force on the proof mass 18 for the duration of this additional pulse. The phase switching in the feedback signal is also applied to the demodulator 70 so that it can preserve the correct polarity of the error signal. The output pulse train is also passed on to the outside world as data, at a terminal A.

FIGS. 5A and 5B show one kind of the elemental waveforms supplied to the proof mass 18 during plus and minus acceleration, respectively However, it is currently preferred to utilize the waveforms depicted in FIGS. 6A, 6B and 6C for no acceleration, plus acceleration and minus acceleration, respectively, since this scheme greatly simplifies the construction and operation of the switching network 61 and of the switch control 66 and eliminates otherwise possible switching and related errors. It is not deemed necessary to detail the construction of the switch control 66 here since its construction and its operating regime will be readily apparent from the respective waveforms illustrated in the drawing.

It will be appreciated that the phase switching in the elemental waveform results in a situation where the time average of the pulses supplied to the proof mass 18 will establish the requisite forcing or nulling voltage or charge on the proof mass 18 and this, in turn, will create respective electrostatic fields between the proof mass 18 and the capacitor. plates 11 and 12 which will force the proof mass 18 to its rest position. Also, the errors amounting to less than a full bit width will be taken care of in a manner similar to that discussed above because they will influence the position of the proof mass 18 and thus the next-following error signal.

While the present invention has been illustrated and described as embodied in a particular construction of an accelerometer using a particular construction of acceleration sensor and of pulsed driving circuitry therefore, it will be appreciated that the present invention is not, limited to this particular example; rather, the scope of protection of the present invention is to be determined solely from the attached claims.

I claim:

1. An accelerometer arrangement comprising
   at least one acceleration sensor including two capacitor plates having respective parallel mutually facing major surfaces which bound a sensing gap therebetween, a plate-shaped electrically chargeable proof mass, and means for resiliently mounting said proof mass in said gap in parallelism with said major surfaces for displacement in response to the action of acceleration forces thereon out of a substantially central rest position toward one or the other of said major surfaces depending on the direction f said acceleration forces;
   means for establishing an electrical potential difference between said capacitor plates to generate respective electrostatic fields between said capacitor plates and said proof mass which cause a proof mass electrical potential variation having a magnitude and sense depending on the extent and direction of said displacement of said proof mass out of said rest position thereof, including means for applying to said capacitor plates respective D.C. voltages which are at substantially constant different levels; and
   means for evaluating said variation and for supplying to said proof mass an electrical control signal sufficient to establish on said proof mass a voltage that is proportionate to said variation and at which electrostatic forces caused thereby between said proof mass and said capacitor plates return said proof mass to said rest position thereof against said action of said acceleration forces thereon, including means for generating a train of pulses which alternate between at least two voltage levels and the succession, duration and sense of which are such that the time average of said pulses substantially establishes said voltage on said proof mass,
   said generating means including a D.C. source, switching means connected to said source and having an output connected to said proof mass, means for controlling said switching means to issue said pulse train at said output thereof; and
   said evaluating means further including means for detecting the effects of said pulse train on the potentials appearing at said capacitor plates and issuing an output signal representative thereof, means for demodulating said output signal with said pulse train, and means for supplying the thus demodulated signal to said controlling means to cause the latter to control the waveform of said pulse train in dependence on the value of said demodulated signal.

2. An arrangement for driving at least one acceleration sensor which includes two capacitor plates having respective parallel mutually facing major surfaces which bound a sensing gap with one another and a plate-shaped electrically chargeable proof mass that is resiliently mounted in the gap in parallelism with the major surfaces for displacement in response to the action of acceleration forces thereon out of a substantially central rest position toward one or the other of the major surfaces depending on the direction of the acceleration forces, comprising means for establishing an electrical potential difference between the capacitor plates to generate respective electrostatic fields between the capacitor plates and the proof mass which cause a proof mass electrical potential variation having a magnitude and sense depending on the extent and direction of the displacement of the proof mass out of its rest position, including means for applying to the capacitor plates respective D.C. voltages which are at substantially constant different levels; and means for evaluating said variation and for supplying to the proof mass an electrical control signal sufficient to establish on the proof mass a voltage that is proportionate to said variation and at which electrostatic forces caused thereby between the proof mass and the capacitor plates return the proof mass to the rest position thereof against the action of said acceleration forces thereon, including means for generating a train of pulses which alternate between at least two voltage levels and the succession, duration and sense of which are such that the time average of said pulses substantially establishes said voltage on the proof mass, said generating means including a D.C. source, switching means connected to said source and having an output connected tot he proof mass, means for controlling said switching means to issue said pulse train at said output thereof; and said evaluating means further including means for detecting the effects of said pulse train on the potentials appearing at the capacitor plates and issuing an output signal representative thereof, means for demodulating said output signal with said pulse train, and means for supplying the thus demodulated signal to said controlling means to cause the latter to control the waveform of said pulse train in dependence on the value of said demodulated signal.

* * * * *